United States Patent
Cearra et al.

(10) Patent No.: US 12,157,346 B2
(45) Date of Patent: Dec. 3, 2024

(54) RECOVERY HEAT EXCHANGER IN AN ENVIRONMENTAL CONTROL SYSTEM

(71) Applicant: THERMO KING LLC, Minneapolis, MN (US)

(72) Inventors: Diego Cearra, Kraluv Dvur (CZ); Pavel Houdek, Kutna Hora (CZ); Petra Stavova, Beroun (CZ); Martin Galansky, Rakovnik (CZ); Petr Trutnovsky, Cervene Pecky (CZ); Michal Kolda, Prague (CZ); Frank Ruemenap, Malsch (DE)

(73) Assignee: THERMO KING LLC, Minneapolis, MN (US)

( * ) Notice: Subject to any disclaimer, the term of this patent is extended or adjusted under 35 U.S.C. 154(b) by 0 days.

(21) Appl. No.: 17/941,862

(22) Filed: Sep. 9, 2022

(65) Prior Publication Data
US 2023/0077670 A1    Mar. 16, 2023

(30) Foreign Application Priority Data
Sep. 10, 2021   (EP) ..................... 21196136

(51) Int. Cl.
*B60H 1/03*   (2006.01)
*B60H 1/00*   (2006.01)

(52) U.S. Cl.
CPC ......... *B60H 1/039* (2019.05); *B60H 1/00028* (2013.01); *B60H 2001/00085* (2013.01)

(58) Field of Classification Search
CPC ............... B60H 1/039; B60H 1/00028; B60H 1/00849; B60H 2001/00085; B60H 2001/00092; F24F 12/003
See application file for complete search history.

(56) References Cited

U.S. PATENT DOCUMENTS

| | | | |
|---|---|---|---|
| 2005/0230096 A1* | 10/2005 | Yamaoka | B60H 1/12 165/42 |
| 2010/0089558 A1* | 4/2010 | Takada | F24F 12/006 165/185 |
| 2020/0298659 A1* | 9/2020 | Sakane | B60H 1/00 |

FOREIGN PATENT DOCUMENTS

| | | | |
|---|---|---|---|
| EP | 2397787 A2 * | 12/2011 | F24D 15/04 |
| EP | 2692557 | 2/2014 | |

(Continued)

OTHER PUBLICATIONS

JP 2012001037 A English Machine Translation (Year: 2012).*
(Continued)

*Primary Examiner* — Jenna M Maroney
(74) *Attorney, Agent, or Firm* — HSML P.C.

(57) ABSTRACT

An environmental control system for thermally conditioning air within an enclosed space comprising: a refrigerant circuit having a compressor, an indoor heat exchanger, an expansion device, and an outdoor heat exchanger. The system further comprises an intake flowpath for directing an intake flow of fresh air to the enclosed space, wherein a heat-transfer section of the indoor heat exchanger is located within the intake flowpath to thermally condition the intake flow of fresh air before entering the enclosed space. The system further comprises an exhaust flowpath for directing an exhaust flow of thermally conditioned air to an external environment. A recovery heat exchanger is configured to transfer thermal energy between the exhaust flow and the intake flow at a location within the intake flowpath that is upstream of the heat-transfer section of the indoor heat exchanger.

15 Claims, 7 Drawing Sheets

(56) References Cited

FOREIGN PATENT DOCUMENTS

| | | | |
|---|---|---|---|
| EP | 3895920 A1 * | 10/2021 | ......... B60H 1/00007 |
| EP | 3895921 A1 * | 10/2021 | ......... B60H 1/00007 |
| JP | 60088626 A * | 10/1983 | |
| JP | 2012-001037 | 1/2012 | |
| JP | 6143616 B2 * | 6/2017 | |
| WO | 2013/105200 | 7/2013 | |
| WO | 2014/009922 | 1/2014 | |
| WO | 2019/202731 | 10/2019 | |

OTHER PUBLICATIONS

JP6143616B2 English Machine Translation (Year: 2017).*
Extended European Search Report, issued in the corresponding EP patent application No. 21196136.2, dated Mar. 4, 2022, 6 pages.

* cited by examiner

RECOVERY HEAT EXCHANGER IN AN ENVIRONMENTAL CONTROL SYSTEM

FIELD OF THE INVENTION

The present invention is concerned generally with environmental control systems, such as heating, ventilation, and air conditioning (HVAC) systems, with heating and/or cooling mode capabilities. In particular, the present invention is concerned with environmental control systems and methods having improved energy efficiency.

BACKGROUND

Environmental control systems, such as HVAC systems, have been developed to manage the environmental conditions, e.g. temperature, of an enclosed space. For example, HVAC systems are often used to heat or cool the air within passenger cabins of mass-transit vehicles such as buses or trains.

Environmental control systems generally include a closed refrigerant circuit that includes a compressor, an indoor heat exchanger, an expansion device and an outdoor heat exchanger, which are connected in series. The refrigerant circuit generally defines a flowpath for a refrigerant which is to be used to transfer thermal energy between the internal and outdoor heat exchangers, to heat or cool an enclosed space (depending on whether the system is operating in a heating mode or a cooling mode of operation).

In a heating mode of operation, the refrigerant flow can be said to begin at the compressor, which is driven by a prime mover to compress the refrigerant to form a superheated refrigerant gas. The superheated refrigerant gas is then delivered to the indoor heat exchanger, which is in thermal communication with the enclosed space to be heated. The enclosed space will be relatively colder than the superheated refrigerant gas, such that heat energy within the refrigerant will be transferred to and thus heat the enclosed space. The indoor heat exchanger may be referred to as a condenser or gas cooler during the heating mode of operation because the refrigerant at this point has either condensed to a liquid or is in the form of a cooled gas (depending on the type of refrigerant used). The refrigerant is then delivered from the indoor heat exchanger to the expansion device (or a series of devices serving to reduce the refrigerant pressure, including expansion valves and expansion vessels for local refrigerant accumulation etc.). As the refrigerant passes through the expansion device, it expands in volume and forms a part liquid (and partly vapour) mixture which is at a reduced pressure and temperature. The refrigerant then passes to the outdoor heat exchanger which is in thermal communication with an external environment that is separate to the enclosed space (e.g. external to the vehicle). As ambient air circulates over the external heat exchanger, the refrigerant absorbs heat energy from the ambient air and evaporates. Accordingly, in the heating mode, the outdoor heat exchanger may be referred to as an evaporator. To complete a heating cycle about the refrigerant circuit, the refrigerant is delivered from the evaporator back to the compressor.

In a cooling mode of operation, the refrigerant flow direction about the circuit is reversed. From the compressor, the superheated refrigerant gas is directed to the outdoor heat exchanger. The ambient air will be relatively colder than the superheated refrigerant gas, such that heat energy within the refrigerant will be transferred to the ambient air. In this mode, the outdoor heat exchanger may be referred to as a condenser or gas cooler (again depending on the type of refrigerant used). The refrigerant is then delivered to the indoor heat exchanger via the expansion device. At the indoor heat exchanger, the refrigerant enters at a reduced pressure and temperature compared to that of the enclosed space, such that the refrigerant absorbs heat energy from the enclosed space and evaporates. Accordingly, in the cooling mode, the indoor heat exchanger may be referred to as an evaporator. To complete a cooling cycle about the refrigerant circuit, the refrigerant is then delivered from the indoor heat exchanger back to the compressor.

Conventionally, environmental control systems condition the air within the enclosed space by recirculating the air between the enclosed space and the indoor heat exchanger. At times, however, it is desirable to introduce fresh air into the enclosed space, e.g. while exhausting some of the thermally conditioned air to the external environment, as this can help to minimize the presence of contagions (such as COVID-19) within the enclosed space. However, the fresh air is typically at a different temperature to the conditioned air within the enclosed space and will therefore need to be heated or cooled to meet a set temperature condition of the enclosed space. To meet this additional heating/cooling demand, the system has to work harder, e.g. by driving the compressor at higher speeds, thereby increasing its energy consumption and running costs. Having to condition fresh air introduced into the enclosed space also increases the time taken for the enclosed space to reach a set temperature condition.

Accordingly, the present invention seeks to improve the heating efficiency of environmental control systems, amongst other things.

SUMMARY OF THE INVENTION

According to an aspect, there is provided an environmental control system for thermally conditioning air within an enclosed space. The system comprises: a refrigerant circuit comprising a compressor, an indoor heat exchanger, an expansion device and an outdoor heat exchanger; an intake flowpath having a first inlet for receiving an intake flow of fresh air and an outlet for discharging the intake flow to the enclosed space, wherein a heat-transfer section of the indoor heat exchanger is located within the intake flowpath to thermally condition the intake flow before entering the enclosed space; an exhaust flowpath having an inlet for receiving an exhaust flow of thermally conditioned air from the enclosed space and an outlet for discharging the exhaust flow to an external environment; and a recovery heat exchanger between the intake flowpath and the exhaust flowpath, wherein the recovery heat exchanger is for transferring thermal energy between the exhaust flow and the intake flow at a location within the intake flowpath that is upstream of the heat-transfer section of the indoor heat exchanger in an intake flow direction.

The recovery heat exchanger may comprise: a first fluid passage which forms part of the intake flowpath at a location that is upstream of the heat-transfer section of the indoor heat exchanger; and a second fluid passage which forms part of the exhaust flowpath; wherein the first fluid passage and the second fluid passage are in thermal communication with each other.

The recovery heat exchanger may be a plate heat exchanger.

A heat-transfer section of the outdoor heat exchanger may be located in the exhaust flowpath at a location that is downstream of the recovery heat exchanger.

The intake flowpath may have a second inlet for receiving thermally conditioned air from the enclosed space at a location that is downstream of the recovery heat exchanger and upstream of the heat transfer section of the indoor heat exchanger in the intake flow direction.

The environmental control system may further comprise a controller which is configured to operate one or more valves or dampers according to a first flow configuration in which the one or more valves or dampers simultaneously: allow an exhaust flow of thermally conditioned air to pass through the exhaust flowpath; allow an intake flow of fresh air to pass through the intake flowpath; and prevent thermally conditioned air from the enclosed space to enter the intake flowpath.

The environmental control system may further comprise a controller controller (e.g. the same controller referred to above) which is configured to operate one or more valves or dampers according to a second flow configuration, in which the one or more valves or dampers simultaneously: allow an exhaust flow of thermally conditioned air to pass through the exhaust flowpath; allow an intake flow of fresh air to pass through the intake flowpath; and allow an intake flow of thermally conditioned air from the enclosed space to pass through the intake flowpath.

According to another aspect, there is provided a vehicle comprising an environmental control system as defined in any preceding statement. The environmental control system may further comprise one or more or all of the features of the system as described in the description below.

The enclosed space may be a passenger cabin of the vehicle and the external environment may be exterior of the vehicle. The vehicle may be a mass-transit vehicle.

It will be appreciated that the enclosed space may be only partly enclosed. For example, where the enclosed space is a passenger cabin of a vehicle, the passenger cabin is not necessarily airtight and may have windows or doors that can be opened and closed by the passengers.

According to another aspect, there is provided a method of thermally conditioning an enclosed space using an environmental control system as defined in any one of the preceding statements. The method may comprise: directing an intake flow of fresh air through the intake flowpath; operating the refrigerant circuit to cause the indoor heat exchanger to thermally condition the intake flow as it passes through the heat-transfer section of the indoor heat exchanger; and directing an exhaust flow of thermally conditioned air through the exhaust flowpath such that the intake flow and the exhaust flow exchange heat energy via the recovery heat exchanger to pre-condition the intake flow before the heat-transfer section of the indoor heat exchanger.

The intake flowpath may have a second inlet for receiving thermally conditioned air from the enclosed space at a location that is downstream of the recovery heat exchanger and upstream of the heat transfer section of the indoor heat exchanger in the intake flow direction. In such arrangements, according to an embodiment of the method, a controller of the environmental control system may operate one or more valves or dampers according to a first flow configuration in which the one or more valves or dampers simultaneously: allow an exhaust flow of thermally conditioned air to pass through the exhaust flowpath; allow an intake flow of fresh air to pass through the intake flowpath; and prevent thermally conditioned air from the enclosed space to enter the intake flowpath. According to another embodiment, a controller controller (e.g. the same controller referred to above) of the environmental control system may operate one or more valves or dampers according to a second flow configuration in which the one or more valves or dampers simultaneously: allow an exhaust flow of thermally conditioned air to pass through the exhaust flowpath; allow an intake flow of fresh air to pass through the intake flowpath; and allow an intake flow of thermally conditioned air from the enclosed space to pass through the intake flowpath.

It will be appreciated that the controller may be provided with computer-readable instructions that, when executed by the controller, cause the controller to perform the method described above, or to otherwise carry out one or more or all of the functional steps described above.

The enclosed space may be within a vehicle and the external environment may be exterior of the vehicle.

BRIEF DESCRIPTION OF THE DRAWINGS

The present invention will now be described by way of example with reference to the accompanying drawings, in which.

DETAILED DESCRIPTION

Figure 1:
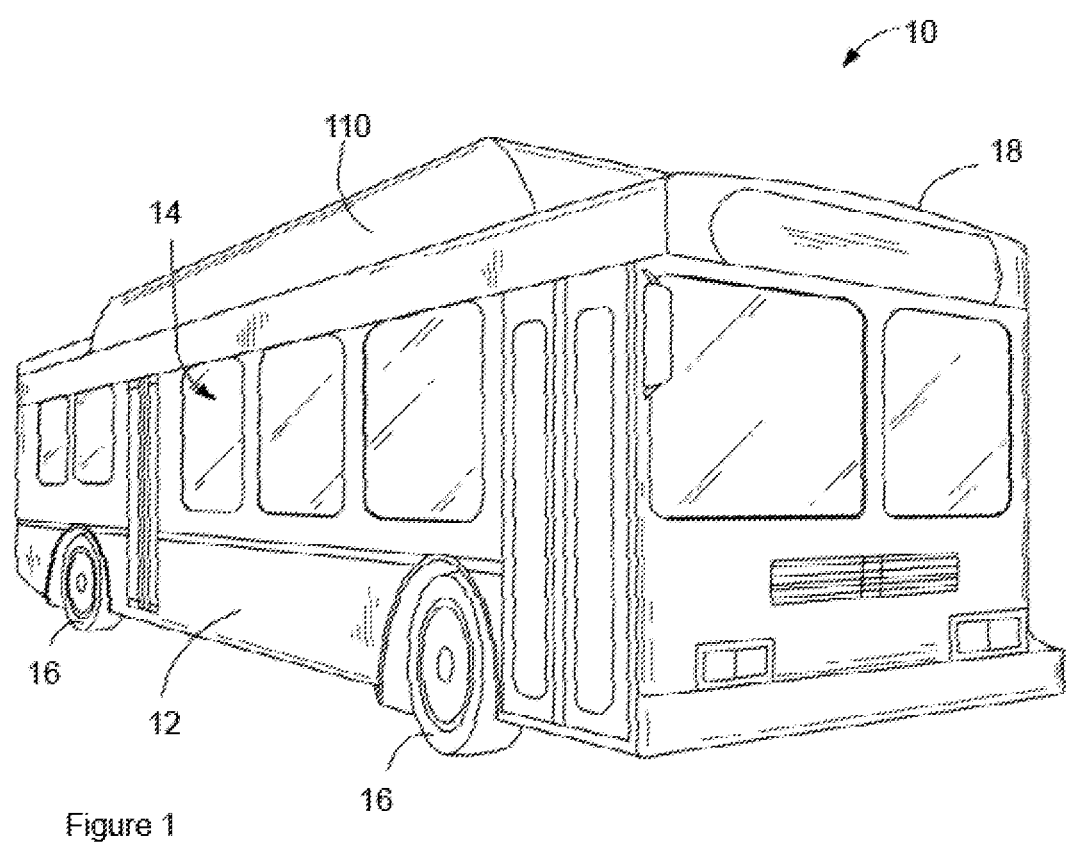
FIG. 1 is a schematic illustration of an exemplary vehicle with which the environmental control system of the present invention may be used.

FIG. 1 shows an exemplary vehicle 10 with which the environmental control system of the present invention may be used. In the embodiment illustrated in FIG. 1, the vehicle 10 is a mass-transit bus that carries passengers (not shown) between destinations. However, the present invention as described herein is applicable more generally to any type of vehicle or indeed any type of enclosed space that can be environmentally controlled. The system may be used, for example, with a train carriage.

As shown in FIG. 1, the vehicle 10 includes a frame 12, an enclosed space forming a passenger cabin 14 which is supported by the frame 12 and wheels 16. Although not shown, the vehicle 10 includes a propulsion system that is configured to drive the wheels 16 and drivetrain (not shown) of the vehicle 10. The propulsion system (e.g., prime mover, engine, etc.) can be an internal combustion engine or alternatively an electrical power source, e.g. a battery assembly, for powering a motor that is coupled to the drivetrain of the vehicle 10. The vehicle 10 may have a hybrid propulsion system comprising both an internal combustion engine and an electrical power source, which can be selectively used to power the drivetrain.

On a roof 18 of the vehicle 10, there is provided an environmental control system 110, in particular a HVAC system, which is configured to control one or more environmental conditions including, but not limited to, a thermal condition of the passenger cabin 14 which is at least partly enclosed.

The environmental control system may control the environmental conditions within an additional or an alternative enclosed space of the vehicle 10. Further, while FIG. 1 shows the environmental control system 110 being located on the roof 18 of the vehicle 10, it can have any location suitable for carrying out its intended purpose of controlling an environmental condition within the vehicle 10.

Figure 2:
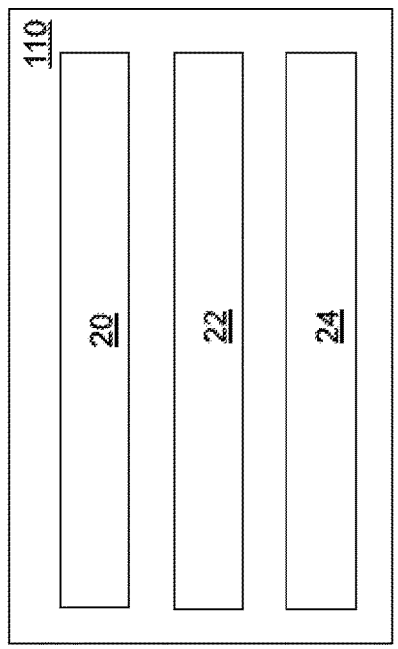
FIG. 2 is a block diagram schematically illustrating an example embodiment of the environmental control system.

FIG. 2 is a schematic diagram representing the environmental control system 110 in more detail.

The environmental control system 110 includes a programmable controller 20. The controller 20 may include a single integrated control unit (not shown) or a distributed network of control elements (not shown). The controller 20 can include a processor, a memory, a clock, and an input/output (I/O) interface (not shown).

Figure 3:
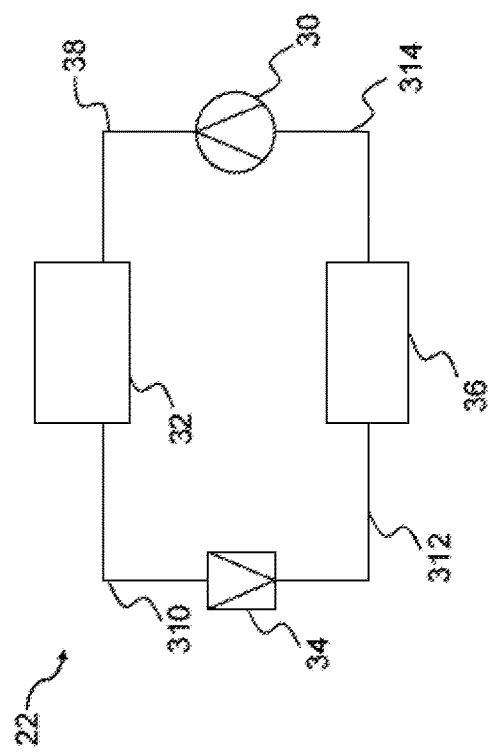
FIG. 3 is a circuit diagram schematically illustrating a refrigerant circuit of the environmental control system.

The environmental control system 110 also includes a closed refrigerant circuit 22. With reference to FIG. 3, the refrigerant circuit 22 comprises a compressor 30, an indoor heat exchanger 32, an expansion device 34 (or a series of devices serving to reduce the refrigerant pressure, including expansion valves and expansion vessels for local refrigerant accumulation etc.), and an outdoor heat exchanger 36 which are connected in series via refrigerant distribution lines 38, 310, 312, 314. The refrigerant circuit 22 generally defines a flowpath for a refrigerant, which is to be used to transfer thermal energy between the indoor heat exchanger 32 and the outdoor heat exchanger 36 as it flows from one to the other along the circuit 22. Any type of refrigerant that is known in the art may be used for this purpose.

The environmental control system 110 further includes a power bay 24, which houses an internal combustion engine (e.g., diesel engine, etc.), that can provide power to drive the compressor and other components of the refrigerant circuit 22. The power bay 24 may also or instead house an on-board electric motor which can provide power to drive the compressor and other components instead of the combustion engine.

The controller 20 itself is powered by a power module (not shown), which can include one or more electrical power sources. The power sources receive electrical power from a generator machine (e.g., a belt-driven alternator, a direct drive generator, etc.) that is mechanically driven by the prime mover of the internal combustion engine or electric motor of the power bay 24. In other embodiments, however, components of the power bay 24 and/or power module may be integrated with one or more components of the propulsion system of the vehicle 10. For example, where the propulsion system of the vehicle 10 is a hybrid or fully electric powered system, the on-board electric motor of the power bay 24 and/or the controller 20 of the environmental control system 110 may be powered by the electrical power source that is configured to power the drivetrain of the vehicle 10.

During operation, the controller 20 controls the refrigerant circuit 22 to obtain a desired state (i.e. temperature condition) of the passenger cabin 14. In particular, the controller 20 may be in communication with one or more sensing devices that are used to measure a number of operating conditions of the environmental control system 110, such as the internal temperature of the passenger cabin 14, ambient temperature of the external environment, and operating parameters of the environmental control system 110, such as evaporator temperature, pressures, etc. in order to allow the controller 20 to draw a conclusion on what action has to be taken to achieve the desired state.

The environmental control system 110 is configured with heating mode and cooling mode capabilities, and the controller 20 is configured to operate the refrigerant circuit 22 in either the heating mode or the cooling mode of operation as appropriate to achieve a set temperature condition within the passenger cabin 14. Furthermore, the controller 20 may compare the current state (e.g. passenger cabin air temperature and ambient air temperature) with a target state (e.g. a set point temperature for the passenger cabin 14) and regulate the current heating capacity or cooling capacity delivered by the environmental control system 110 accordingly. This may be done by sending control signaling to various control devices of the environmental control system 110, such as the compressor 30, refrigeration throttling valves, dampers etc., which control the movement of the refrigerant through the refrigerant circuit 20.

It will be appreciated that, in other embodiments, the environmental control system 110 may be configured with only one of the heating mode and cooling mode operations.

Figure 4:
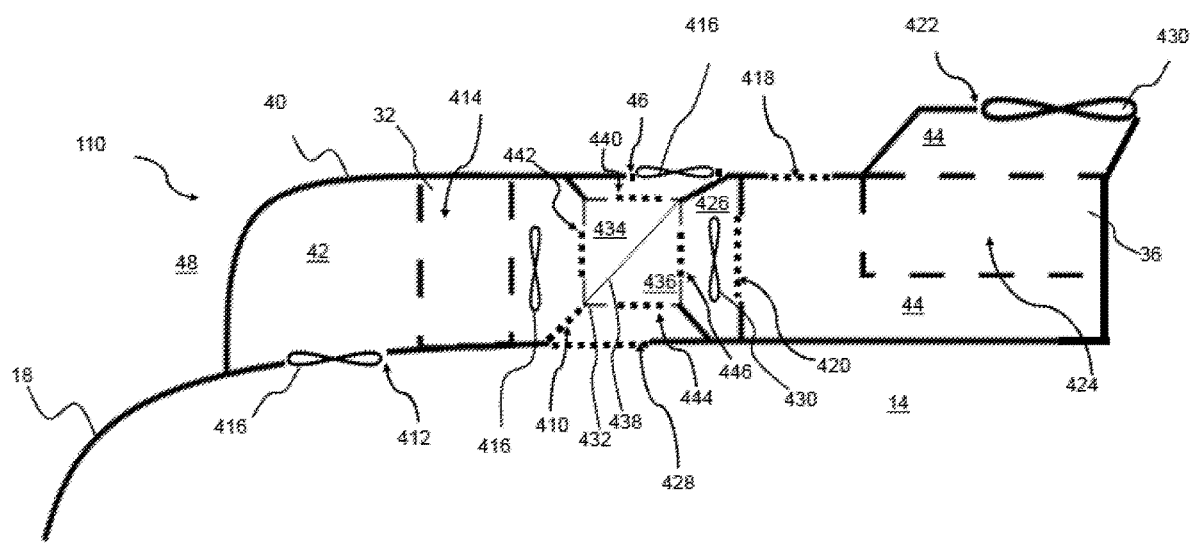
FIG. 4 schematically illustrates the environmental control system, in accordance with an embodiment of the present invention.

FIG. 4 schematically illustrates the environmental control system, in accordance with an embodiment of the present invention.

The system 110 comprises a housing 40 that encloses and protects some of the components of the refrigeration circuit. The housing 40 comprises a first compartment 42, within which the indoor heat exchanger 32 is located, and a second compartment 44, within which the outdoor heat exchanger 36 is located.

The first compartment 42 has a first air inlet 46 on the exterior of the housing 40, which is suitable for receiving a flow of fresh air into the first compartment 42 from the external environment 48 exterior to the vehicle. A second air inlet 410 of the first compartment 42 is fluidically connected to the passenger cabin 14, so that the first compartment 42 is suitable for receiving a flow of thermally conditioned air from the passenger cabin 14 in addition to, or instead of, the fresh air from the external environment 48. The first compartment 42 also has an air outlet 412, which fluidically connects the first compartment 42 to the passenger cabin 14, so that air is able to be discharged from the first compartment 42 and into the passenger cabin 14.

The indoor heat exchanger 32 comprises a heat-transfer section 414 which is located in the first compartment 42 at an intermediate location that is downstream of the first and second air inlets 46, 410 but upstream of the air outlet 412 in a flow direction. In use, fresh air received in the first compartment 42 through the first air inlet 46 and/or thermally conditioned air received in the first compartment 42 through the second air inlet 410 will be directed through (or otherwise will be in thermal communication with) the heat transfer section 414 of the indoor heat exchanger 32 to thermally condition the air. The thermally conditioned air will then be supplied to the passenger cabin 14 via the air outlet 412.

In the manner described above, the first compartment 42 defines, at least in part, an intake flowpath in that it is suitable for directing an intake flow of air (fresh air and/or thermally conditioned air) to the passenger cabin 14 via the indoor heat exchanger 32. To promote airflow through the intake flowpath, the first compartment 42 has a plurality of fans 416 which are operable to draw air into the first compartment 42 and correspondingly eject air from the first compartment 42 through the air outlet 412.

The second compartment 44 has a first air inlet 418 on the exterior of the housing 40, which is suitable for receiving fresh air from the external environment 48. Additionally, the second compartment 44 is fluidically connected to the passenger cabin 14 via a second air inlet 420, so that the second compartment 44 is suitable for receiving thermally conditioned air from the passenger cabin 14 in addition to, or instead of, the fresh air from the external environment 48. The second compartment 44 further comprises an air outlet 422 on the exterior of the housing 40, so that air is able to be discharged from the second compartment 44 to the external environment 48.

The outdoor heat exchanger 36 comprises a heat-transfer section 424 which is located in the second compartment 44 at an intermediate location that is downstream of the first and second air inlets 418, 420 but upstream of the air outlet 422. In use, air received in the second compartment 44 will be directed through (or otherwise will be in thermal communication with) the heat transfer section 424 before exiting the second compartment 44 via the air outlet 422. The outdoor heat exchanger 36 is configured to exchange thermal energy between the refrigerant of the circuit 20 and the flow of air passing through its heat transfer section 424.

The second air inlet 420 of the second compartment 44 is fluidically connected to the passenger cabin 14 via a third compartment 426. The third compartment 426 has a single inlet 428 for receiving thermally conditioned air from the passenger cabin 14 and is suitable for directing conditioned air to the second air inlet 420 of the second compartment 44. The second compartment 44 and the third compartment 426 therefore define an exhaust flowpath for directing an exhaust flow of thermally conditioned air from the cabin 14 to the external environment 48 (and via the heat transfer section 424 of the outdoor heat exchanger 36, in this example embodiment). The exhaust flowpath further comprises fans 430 which are operable to promote air flow through the exhaust flowpath to the air outlet 422.

Both the indoor and outdoor heat exchangers 32, 36 are refrigerant-to-air heat exchangers in that they are configured to transfer thermal energy between a refrigerant (of the refrigerant circuit) and air passing through their respective heat transfer sections 414, 424. Any known type of refrigerant-to-air heat exchanger may be used, such as a finned-tube-coil heat exchanger, in which refrigerant flows through a coiled tube (the heat transfer section) and air is directed over the coiled tube so as to exchange thermal energy with the refrigerant in the tube.

The environmental control system 110 further comprises an air-to-air recovery heat exchanger 432 between the intake flowpath and the exhaust flowpath, for exchanging thermal energy between the intake flow to the cabin 14 and the exhaust flow to the external environment 48. The recovery heat exchanger 432 comprises a first fluid passage 434 and a second fluid passage 436 which are physically separated by a heat transfer partition 438, through which thermal energy can be exchanged between separate airflows passing through the respective fluid passages 434,436. In the present embodiment, the recovery heat exchanger 432 is a plate heat exchanger in that the heat transfer partition comprises a metal plate which transfers heat between the intake and exhaust flows.

The first fluid passage 434 has an inlet 440, which is downstream of the first inlet 46 to the first compartment 42, and an outlet 442, which is upstream of the heat transfer section 414 of the indoor heat exchanger 32. Accordingly, the first fluid passage 434 forms part of the intake flowpath at a location that is upstream of the heat transfer section 414 of the indoor heat exchanger 32 but is downstream of the first inlet 46 so as to receive a flow of fresh air to be thermally conditioned. The second fluid passage 436 has an inlet 444, which is downstream of the inlet 428 to the third compartment 426, and an outlet 446, which is upstream of the second inlet 420 to the second compartment 44. Therefore, the second fluid passage 436 forms part of the exhaust flowpath and will receive a flow of thermally conditioned air from the passenger cabin 14 in use. In this way, the recovery heat exchanger 428 is able to exchange thermal energy between an intake flow of fresh air that is to be thermally conditioned and an exhaust flow of thermally conditioned air exiting the cabin 14.

As is illustrated by the dashed lines in FIG. 4, in the present embodiment, the inlets and outlets described above each comprises air-regulating means, such as a valve or damper (e.g. a flap), for controlling the airflow therethrough. Accordingly, each inlet and/or outlet has a fully open and a fully closed configuration for respectively allowing and preventing a flow of air therethrough. In embodiments, an inlet/outlet can be set to an intermediate, partially open/closed configuration. The valve may be an electronic valve which is actuated (and thus set to the open, closed, or intermediate configuration) under the direction of control signalling received from the controller 20 of the system 110.

It will be appreciated that the structure of the intake flowpath and the exhaust flowpath may differ from that described above. For example, the intake flowpath may comprise more than one compartment or duct that fluidically connect the external environment 48 (and/or passenger cabin 14) to the passenger cabin 14 via the indoor heat exchanger 32. Further, the second inlet 410 to the first compartment 42 may be separate to the exhaust flowpath (the third compartment 426 in FIG. 4). The exhaust flowpath may comprise only one compartment or duct. It will also be appreciated that the exact configuration and number of valves and fans may differ from system to system and may depend on the structure and number of compartments used to define the flowpaths. For example, there is no need for an inlet 428 to the third compartment 426.

Although the indoor heat exchanger 32 and the outdoor heat exchanger 34 have been described above as being located within the first compartment 42 and the second compartment 44, respectively, in practice it may be that only the heat transfer sections 414, 424 of those heat exchangers 32, 36 are located within the first and second compartments 42, 44 (and thus their corresponding flowpaths).

It is also noted that although the outdoor heat exchanger 36 and heat-transfer section 424 has been described above as being located within the exhaust flowpath, this is not required. That is, the exhaust flowpath may direct thermally conditioned air from the cabin 14 to the external environment 48 without passing through the outdoor heat exchanger 36. The outdoor heat exchanger 36 may be provided in a separate compartment of the housing and may be supplied with fresh air only.

Figure 5:
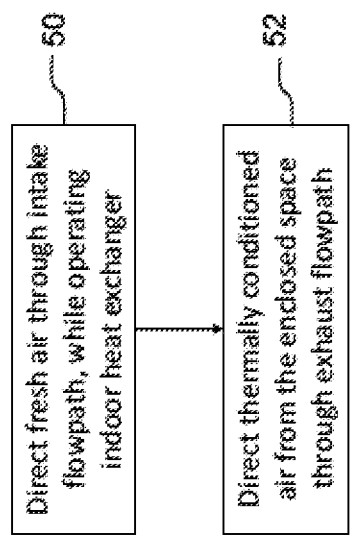
FIG. 5 is a flow diagram schematically illustrating a method of operating the environmental control system of FIGS. 1 to 4.

FIG. 5 is a flow diagram schematically illustrating a method of operating the environmental control system of FIGS. 1 to 4 to thermally condition the passenger cabin 14 of the vehicle 10.

The method begins at block 50, at which fans 416 operate to draw an intake flow of fresh air through the intake flowpath. The intake flow is directed along an intake flow direction from the first inlet 46 of the first compartment 42, through the first fluid passage 434 of the recovery heat exchanger 432 and then the heat transfer section 414 of the indoor heat exchanger 32. The refrigerant circuit 22 is operated by the controller 20 to drive a refrigerant between the indoor heat exchanger 32 and the outdoor heat exchanger 36 in a heating mode of operation or a cooling mode of operation, to respectively heat or cool the intake flow before the thermally conditioned intake flow is directed onwards to the passenger cabin 14 via outlet 412.

At substantially the same time, at block 52, thermally conditioned air is exhausted from the passenger cabin 14 and is directed through the exhaust flowpath in an exhaust flow direction from the inlet 428, through the second fluid passage 436 of the recovery heat exchanger 432 and then the external environment 48 (via the outdoor heat exchanger 36, in the example embodiment of FIG. 4).

By simultaneously directing an intake flow of fresh air through the first fluid passage 434 and an exhaust flow of thermally conditioned air through the second fluid passage 436 of the recovery heat exchanger 432, the intake airflow and the exhaust airflow will exchange thermal energy via the heat-transfer partition 438 if there exists a temperature differential between the two airflows. In this way, the present invention can utilize the thermally conditioned air to pre-condition the intake airflow before it enters the indoor heat exchanger 32. Specifically, the recovery heat exchanger 432 is used to reduce the temperature difference between the fresh air that is to be thermally conditioned by the indoor heat exchanger 32 and the air within the passenger cabin 14. This may be advantageous in that the refrigeration circuit will have to work less to bring the fresh air received in the intake flowpath to the set temperature condition of the cabin 14.

In the heating mode of operation, the indoor heat exchanger is working as a condenser or gas cooler, and the outdoor heat exchanger is working as an evaporator. Fresh air from the external environment 48 will be at a lower temperature than the thermally conditioned (heated) air within the passenger cabin 14 (which may be at the set temperature). Therefore, by directing heated air from the cabin 14 through the second fluid passage 436 of the recovery heat exchanger 432, at least some of that heat will be recovered and used advantageously to increase the temperature of the fresh air that is to be delivered to and heated by the indoor heat exchanger 32. In this way, the air fresh air entering the heat transfer section 414 of the indoor heat exchanger 32 will be pre-heated (as compared to the fresh ambient air) before it passes through the indoor heat exchanger 32 for further heating by the refrigerant in the circuit 22. Accordingly, the refrigerant circuit 22 will require less work to increase the intake airflow temperature to the set temperature of the cabin 14. This can improve the energy efficiency of the system 110.

In the cooling mode of operation, fresh air from the external environment 48 will be at a higher temperature than the thermally conditioned (cooled) air within the passenger cabin 14. Therefore, by directing cooled air exhausted from the cabin 14 through the second fluid passage 436 of the recovery heat exchanger 432, at least some of that cooling capacity can be recovered and used advantageously to reduce the temperature of the fresh air that is to be cooled by the indoor heat exchanger 32 of the intake flowpath. Specifically, the cooled air will take on heat from the intake flow of fresh air passing through the first fluid passage 434. Thus, the fresh air in the intake flowpath will already be pre-cooled before it passes through the heat transfer section 414 of the indoor heat exchanger 32 for further cooling. Accordingly, the refrigerant circuit 22 will require less work to reduce the intake airflow temperature to the set temperature of the cabin 14, thereby improving the energy efficiency of the system 110.

After exiting the second fluid passage 436 of the recovery heat exchanger 432, the exhaust flow of thermally conditioned air will be directed into the second compartment 44 through the second inlet 420 which is upstream of the heat transfer section 424 of the outdoor heat exchanger 36. Therefore, the exhaust flow of thermally conditioned air will mix with the fresh air introduced to the second compartment 44 via the first inlet 418 before that mixture is then directed through the heat transfer section 424.

In the heating mode of operation, the exhaust flow of thermally conditioned air entering the second compartment 44 will have a higher temperature than the fresh air entering the second compartment 44 via the first inlet 418. In the cooling mode of operation, the exhaust flow of thermally conditioned air entering the second compartment 44 will have a lower temperature than the fresh air entering the compartment 44. Therefore, by directing thermally conditioned air through the exhaust flowpath, the exhaust flow can be used advantageously to increase the temperature difference and thus the extent of heat transfer between the air flowing through the outdoor heat exchanger 36 and the refrigerant therein. This can improve the operating conditions of the outdoor heat exchanger 36 and consequently the refrigeration circuit 22 will operate under better operating conditions for higher energy efficiency. This will now be described in further detail for the heating mode and the cooling mode of operation, in turn.

In the heating mode of operation, the refrigerant is configured to evaporate as relatively hotter fresh air passes through the heat transfer section 424 of the outdoor heat exchanger 36. However, the exhaust flow of thermally conditioned (heated) air will, when mixed with the fresh air received in the second compartment 44, increase the temperature of the air mixture flowing through the heat transfer section 424, and in turn the temperature difference between the air mixture and the refrigerant in the heat transfer section 424. This may increase an extent of heat transfer between the air mixture and the refrigerant, thereby improving the efficiency of the system.

Further, increasing the temperature of the air mixture has the effect of increasing the evaporating temperature and pressure, and also the condensing temperature and pressure of the refrigeration circuit 22, accordingly. At these shifted operating conditions, the refrigerant density at the compressor inlet (suction line 314) increases, which results in a higher refrigerant mass flow through the circuit 22. It will be appreciated that, with an increased mass flow through the circuit, the heating capacity of the indoor heat exchanger 32 (condenser) is increased; the enthalpy difference between the refrigerant inlet and outlet of the indoor heat exchanger (condenser) remains very similar. The compressor power input remains substantially the same because of a smaller ratio between compressor suction and discharge pressures. In this way, the invention may have the effect of increasing the heating capacity of the indoor heat exchanger 32 without substantially increasing the compressor power input, thereby further improving the energy efficiency of the system.

In the cooling mode of operation, the refrigerant is configured to be cooled and, depending on the refrigerant used, condensed by relatively colder fresh air as it passes through the heat transfer section 424 of the outdoor heat exchanger 36. However, the exhaust flow of thermally conditioned (cooled) air exiting the recovery heat exchanger 432 will, when mixed with the fresh air received in the second compartment 44, reduce the temperature of the air mixture that enters and passes through the heat transfer section 424. This may increase the temperature difference between the air mixture and the refrigerant in the heat transfer section 424 and thus the extent of heat transfer between the air mixture and the refrigerant. Further, it has the effect of reducing the condensing temperature and pressure of the refrigeration circuit 22 towards the evaporating temperature and pressure of the circuit. Consequently, a pressure differential between the high- and low-pressure sides of the refrigeration circuit 22 becomes smaller, meaning that the compressor 22 has to work less, thereby lowering its consumption.

It will be appreciated that, although the invention has been described above as directing a mixture of thermally conditioned air and fresh air through the outdoor heat exchanger 36, this is not required. For example, in use the first inlet 418 to the second compartment 44 may be closed to prevent fresh air from entering the second compartment 44. In that case, only thermally conditioned air will be directed through the heat transfer section 424 of the outdoor heat exchanger 36. This may further increase the temperature difference and thus the extent of heat transfer between the air flowing through the outdoor heat exchanger 36 and the refrigerant therein. It may also further improve the operating conditions of the refrigerant circuit, as described above.

As will now be described with respect to FIGS. 6 to 8, the system 110 is preconfigured with three possible flow configurations, which can be selected by the controller 20, e.g. under user instruction.

Figure 6:
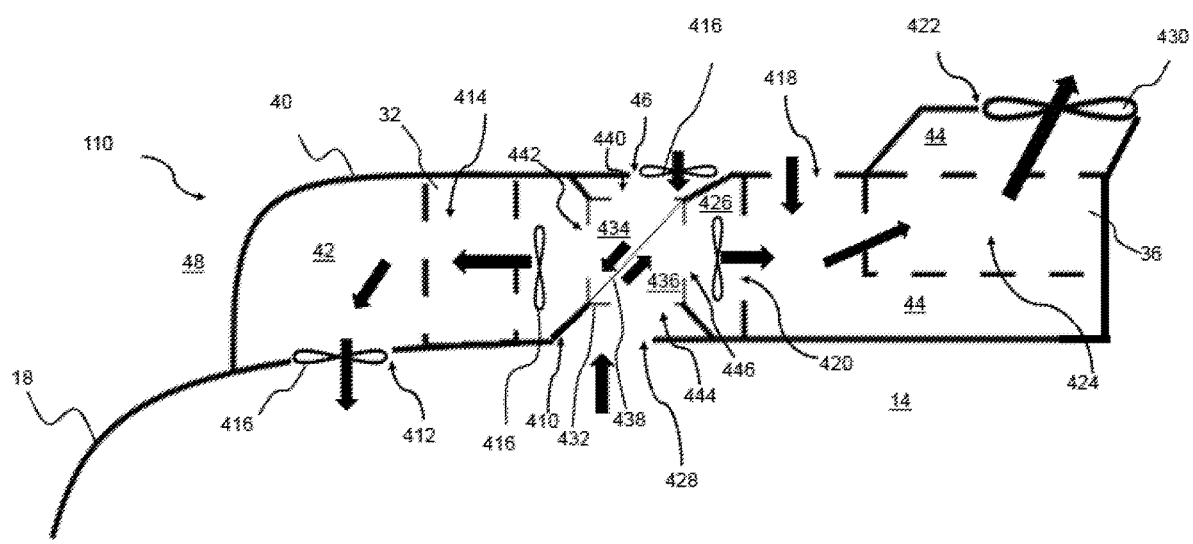
FIG. 6 schematically illustrates a first flow configuration of the environmental control system.

FIG. 6 schematically illustrates a first flow configuration of the environmental control system 110, where the flow direction through the system is indicated by arrows.

In this configuration, 100% of the intake flow through the intake flowpath and thus the indoor heat exchanger 32 is fresh air received from the external environment 48. That is, thermally conditioned air which may be contaminated by passengers in the cabin 14 is not recirculated or returned to the cabin. Accordingly, a valve or damper of the first inlet 46 to the first compartment 42 is in a partially or fully open position to allow a supply of fresh air to enter the intake flowpath (first compartment 42) through the first inlet 46. At the same time, a valve or damper of the inlet 428 to the third compartment 426 is open to allow a flow of thermally conditioned air to be exhausted from the passenger cabin 14 to the exhaust flowpath. However, a valve or damper of the second inlet 410 to the first compartment 42 is closed to prevent the thermally conditioned air from entering the first compartment 42.

The valves or dampers of inlets 440, 444 and outlets 442, 446 of the first and second fluid passages of the recovery heat-exchanger 432 are open to allow the intake flow of fresh air to pass through the first fluid passage 434 and the exhaust flow of thermally conditioned air to pass through the second fluid passage 436 of the recovery heat exchanger 432. The intake flow and the exhaust flow travel in opposite directions through the recovery heat exchanger 432, to encourage additional heat transfer through the heat transfer partition 438.

After heat transfer at the recovery heat exchanger 432, the intake flow is directed to the heat transfer section 414 of the indoor heat exchanger 32 and the newly conditioned air exiting the heat transfer section 414 of the indoor heat exchanger 32 is supplied to the passenger cabin 14 through outlet 412, the valve or damper of which is open.

The exhaust flow is directed to the second compartment 44 after exiting the recovery heat exchanger 432. In the illustrated embodiment, valves or dampers of the first inlet 418 and the second inlet 420 to the second compartment 44 are open, such that the second compartment 44 will receive fresh air from the external environment 48 as well as thermally conditioned air from the passenger cabin 14. In the second compartment 44, the thermally conditioned air mixes with the fresh air before that air mixture is discharged from the second compartment 44 through an open valve or damper of the outlet 422 after passing through the heat transfer section 424 of the outdoor heat exchanger 36.

It will be appreciated that the flow rate or volume of thermally conditioned air exhausted from the passenger cabin 14 may be set to match that of the intake flow entering the passenger cabin 14, to maintain a constant air pressure within the cabin 14. This may be achieved by regulating the extent by which one or more of the valves or dampers are open/closed.

Figure 7:
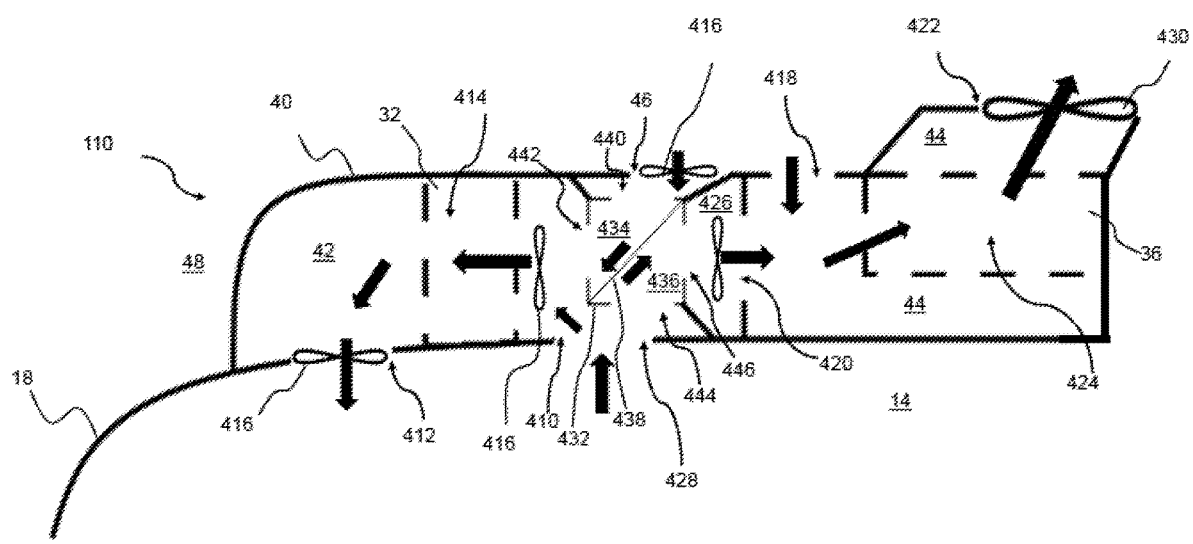
FIG. 7 schematically illustrates a second flow configuration of the environmental control system.

FIG. 7 schematically illustrates a second flow configuration of the environmental control system 110, where the flow direction through the system is indicated by arrows.

The second configuration is substantially the same as the first configuration described above with respect to FIG. 6, except that a valve or damper of the second inlet 410 to the first compartment 42 is open, such that a mixture of fresh air and thermally conditioned cabin air is supplied to the intake flowpath for thermal conditioning before entering the passenger cabin 14. The amount of fresh air entering the first compartment 42, e.g. as a percentage of total air entering the first compartment 42, can be controlled by setting or adjusting the extent by which the valves or dampers at inlets 46 and 410 are open/closed.

The thermally conditioned cabin air enters the intake flowpath at a position that is downstream of the outlet of the first fluid passage 434 of the recovery heat exchanger 432 but upstream of the indoor heat exchanger 32 in the intake flow direction. Accordingly, the thermally conditioned air from the cabin will mix with the pre-conditioned air exiting the recovery heat exchanger 432 before passing through the heat transfer section 414 of indoor heat exchanger 32.

The applicant has recognised that, although a temperature difference between the pre-conditioned fresh air exiting the first fluid passage 434 and the thermally conditioned cabin air will have been reduced at the recovery heat exchanger 432, there will still be some temperature difference as a result of inherent inefficiencies of the recovery heat exchanger 432. Therefore, by mixing the pre-conditioned fresh air with the thermally conditioned air entering the intake flowpath from the cabin 14, the temperature difference between the air mixture entering the indoor heat exchanger 32 and the cabin air can be reduced even further. This may further improve the energy efficiency of the refrigerant circuit, which will have to work less to reduce that temperature difference to meet a set temperature condition in the cabin 14.

It will again be appreciated that, although the invention has been described above as directing a mixture of thermally conditioned air and fresh air through the heat transfer section 424 of the outdoor heat exchanger 36, this is not required. In both embodiments of FIGS. 6 and 7, the first inlet 418 to the second compartment 44 may be closed to prevent fresh air from entering the second compartment 44. Furthermore, it will be appreciated that the exhaust flow of thermally conditioned air need not be directed through the heat transfer section 424 of the outdoor heat exchanger 36. Instead, after exiting the second fluid passage 436 of the recovery heat exchanger 432, the exhaust flow may bypass the second compartment 44 and be ejected to the external environment.

Figure 8:
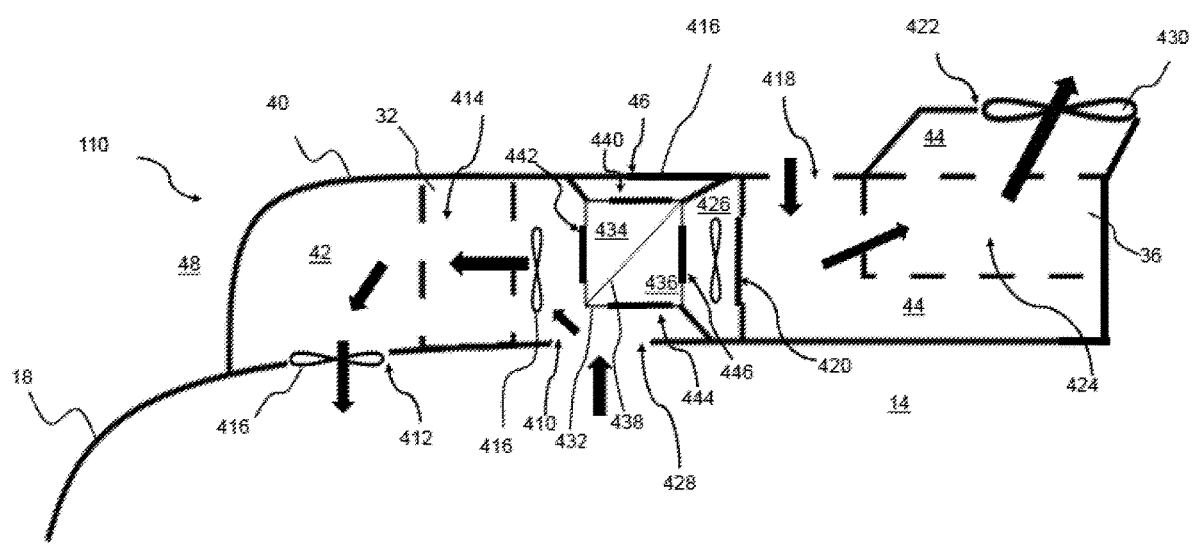
FIG. 8 schematically illustrates a third flow configuration of the environmental control system.

FIG. 8 schematically illustrates a third flow configuration of the environmental control system 110, in which zero fresh air is introduced into the cabin 14.

In this configuration, the valve or damper of the first inlet 46 to the first compartment 42 is closed to prevent fresh air from entering the first compartment 42. Further, valves or dampers of the inlets 440, 444 and outlets 442, 446 of the first and second fluid passages 434, 436 are closed to prevent a flow of air through the recovery heat exchanger 432.

The valve or damper of the second inlet 410 of the first compartment 42 is open to allow thermally conditioned cabin air to enter the first compartment 42 before being recirculated to the cabin 14 via the indoor heat exchanger 32. Specifically, air from the cabin 14 will enter the first compartment 42 through inlet 410, pass through the heat transfer section 414 of the indoor heat exchanger 32 and then return to the cabin 14 through outlet 412.

The valve or damper of the first inlet 418 to the second compartment 44 is open to receive a supply of fresh air in the second compartment 44. The valve or damper of the second inlet 420 is closed to prevent thermally conditioned air from entering the second compartment 44. Accordingly, only fresh air will be directed through the heat transfer section 424 of the outdoor heat exchanger 36 before exiting the compartment via outlet 422.

While the third flow configuration does not direct thermally conditioned cabin air through the recovery heat exchanger 432, and therefore does not benefit from the above-described advantages of the invention, it may nevertheless be advantageous to provide a system which can utilise the third flow configuration as an alternative option for the user, to be used should an intake of fresh air to the cabin be undesirable. For example, its inclusion in addition to the first and/or second flow configuration provides a more versatile system.

In view of the above, it can be seen that the present invention provides a versatile environmental control system that can be used advantageously to increase system efficiency.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. That is, the present disclosure is not limited to the embodiments above described and except where mutually exclusive, any of the features may be employed separately or in combination with any other features and the disclosure extends to and includes all combinations and sub-combinations of one or more features described herein.

The word "embodiment" as used within this specification may, but does not necessarily, refer to the same embodiment. This specification and the embodiments described are examples only. Other and further embodiments may be devised without departing from the basic scope thereof, with the true scope of the disclosure being indicated by the claims that follow.

The invention claimed is:

1. An environmental control system for thermally conditioning air within an enclosed space, the environmental control system comprising:
   a refrigerant circuit comprising a compressor, an indoor heat exchanger, an expansion device and an outdoor heat exchanger;
   a housing including a first compartment including the indoor heat exchanger, a second compartment including the outdoor heat exchanger, and a third compartment disposed between the first compartment and the second compartment;
   an intake flowpath having a first inlet at the third compartment for receiving an intake flow of fresh air and an outlet at the first compartment for discharging the intake flow to the enclosed space, wherein a heat-transfer section of the indoor heat exchanger is located within the intake flowpath to thermally condition the intake flow before entering the enclosed space;
   an exhaust flowpath having an inlet at the third compartment for receiving an exhaust flow of thermally conditioned air from the enclosed space and an outlet at the second compartment for discharging the exhaust flow to an external environment; and
   a recovery heat exchanger, disposed within the third compartment, between the intake flowpath and the exhaust flowpath, wherein the recovery heat exchanger is for transferring thermal energy between the exhaust flow and the intake flow at a location within the intake flowpath that is upstream of the heat-transfer section of the indoor heat exchanger in an intake flow direction,
   wherein a heat-transfer section of the outdoor heat exchanger is located in the exhaust flowpath at a location that is downstream of the recovery heat exchanger,
   wherein the exhaust flowpath comprises a second inlet at the second compartment for receiving fresh air from the external environment at a location which is upstream of the heat-transfer section of the outdoor heat exchanger in an exhaust flow direction, whereby the exhaust flowpath is suitable for directing a mixture of fresh air and thermally conditioned air to the heat-transfer section of the outdoor heat exchanger,
   wherein the recovery heat exchanger comprises:
      a first fluid passage which forms part of the intake flowpath at a location that is upstream of the heat-transfer section of the indoor heat exchanger; and
      a second fluid passage which forms part of the exhaust flowpath, wherein the second fluid passage is physically separated from the first fluid passage by a heat transfer partition;
   wherein the first fluid passage and the second fluid passage are in thermal communication with each other,
   wherein the intake flowpath within the first fluid passage is directed in a direction along an intake flowpath side of the heat transfer partition,
   wherein the exhaust flowpath within the second fluid passage is directed in a direction along an exhaust flowpath side of the heat transfer partition, and
   wherein the intake flowpath within the first fluid passage is directed along a length of a first surface of the heat transfer partition and the exhaust flowpath within the second fluid passage is directed in an opposite direction along a length of a second surface of the heat transfer partition, wherein the first surface of the heat transfer partition is an opposing surface of the second surface of the heat transfer partition.

2. The environmental control system of claim 1, wherein the recovery heat exchanger is a plate heat exchanger.

3. The environmental control system of claim 1, wherein: the intake flowpath has a second inlet for receiving thermally conditioned air from the enclosed space at a location that is downstream of the recovery heat exchanger and upstream of the heat transfer section of the indoor heat exchanger in the intake flow direction.

4. The environmental control system of claim 3, wherein the environmental control system further comprises a controller which is configured to operate one or more valves or dampers according to a first flow configuration in which the one or more valves or dampers simultaneously:
   allow an exhaust flow of thermally conditioned air to pass through the exhaust flowpath;
   allow an intake flow of fresh air to pass through the intake flowpath; and
   prevent thermally conditioned air from the enclosed space to enter the intake flowpath.

5. The environmental control system of claim 3, wherein the environmental control system further comprises a controller which is configured to operate one or more valves or dampers according to a second flow configuration, in which the one or more valves or dampers simultaneously:
   allow an exhaust flow of thermally conditioned air to pass through the exhaust flowpath;
   allow an intake flow of fresh air to pass through the intake flowpath; and
   allow an intake flow of thermally conditioned air from the enclosed space to pass through the intake flowpath.

6. A vehicle comprising:
   an environmental control system that includes:
      a refrigerant circuit comprising a compressor, an indoor heat exchanger, an expansion device and an outdoor heat exchanger;
      a housing including a first compartment including the indoor heat exchanger, a second compartment including the outdoor heat exchanger, and a third compartment disposed between the first compartment and the second compartment;
      an intake flowpath having a first inlet at the third compartment for receiving an intake flow of fresh air and an outlet at the first compartment for discharging the intake flow to the enclosed space, wherein a heat-transfer section of the indoor heat exchanger is located within the intake flowpath to thermally condition the intake flow before entering the enclosed space;
      an exhaust flowpath having an inlet at the third compartment for receiving an exhaust flow of thermally conditioned air from the enclosed space and an outlet at the second compartment for discharging the exhaust flow to an external environment; and
      a recovery heat exchanger, disposed within the third compartment, between the intake flowpath and the exhaust flowpath, wherein the recovery heat exchanger is for transferring thermal energy between the exhaust flow and the intake flow at a location within the intake flowpath that is upstream of the heat-transfer section of the indoor heat exchanger in an intake flow direction,
      wherein a heat-transfer section of the outdoor heat exchanger is located in the exhaust flowpath at a location that is downstream of the recovery heat exchanger,
   wherein the exhaust flowpath comprises a second inlet at the second compartment for receiving fresh air from the external environment at a location which is upstream of the heat-transfer section of the outdoor heat exchanger in an exhaust flow direction, whereby the exhaust flowpath is suitable for directing a mixture of fresh air and thermally conditioned air to the heat-transfer section of the outdoor heat exchanger,
   wherein the recovery heat exchanger comprises:
      a first fluid passage which forms part of the intake flowpath at a location that is upstream of the heat-transfer section of the indoor heat exchanger; and
      a second fluid passage which forms part of the exhaust flowpath, wherein the second fluid passage is physically separated from the first fluid passage by a heat transfer partition;
   wherein the first fluid passage and the second fluid passage are in thermal communication with each other,
   wherein the intake flowpath within the first fluid passage is directed in a direction along an intake flowpath side of the heat transfer partition,
   wherein the exhaust flowpath within the second fluid passage is directed in a direction along an exhaust flowpath side of the heat transfer partition, and
   wherein the intake flowpath within the first fluid passage is directed along a length of a first surface of the heat transfer partition and the exhaust flowpath within the second fluid passage is directed in an opposite direction along a length of a second surface of the heat transfer partition, wherein the first surface of the heat transfer partition is an opposing surface of the second surface of the heat transfer partition.

7. The vehicle of claim 6, wherein the enclosed space is a passenger cabin of the vehicle and the external environment is exterior of the vehicle.

8. The vehicle of claim 7, wherein the vehicle is a mass-transit vehicle.

9. A method of thermally conditioning an enclosed space using an environmental control system that includes: a refrigerant circuit comprising a compressor, an indoor heat exchanger, an expansion device and an outdoor heat exchanger; a housing including a first compartment including the indoor heat exchanger, a second compartment including the outdoor heat exchanger, and a third compartment disposed between the first compartment and the second compartment; an intake flowpath having a first inlet at the third compartment for receiving an intake flow of fresh air and an outlet at the first compartment for discharging the intake flow to the enclosed space, wherein a heat-transfer section of the indoor heat exchanger is located within the intake flowpath to thermally condition the intake flow before entering the enclosed space; an exhaust flowpath having an inlet at the third compartment for receiving an exhaust flow of thermally conditioned air from the enclosed space and an outlet at the second compartment for discharging the exhaust flow to an external environment; and a recovery heat exchanger, disposed within the third compartment, between the intake flowpath and the exhaust flowpath, wherein the recovery heat exchanger is for transferring thermal energy between the exhaust flow and the intake flow at a location within the intake flowpath that is upstream of the heat-transfer section of the indoor heat exchanger in an intake flow direction, wherein a heat-transfer section of the outdoor heat exchanger is located in the exhaust flowpath at a location that is downstream of the recovery heat exchanger, wherein the exhaust flowpath comprises a second inlet for receiving fresh air from the external environment at a location which is upstream of the heat-transfer section of the outdoor heat exchanger in an exhaust flow direction, whereby the exhaust flowpath is suitable for directing a mixture of fresh air and thermally conditioned air to the heat-transfer section of the outdoor heat exchanger, wherein the recovery heat exchanger comprises: a first fluid passage which forms part of the intake flowpath at a location that is upstream of the heat-transfer section of the indoor heat exchanger; and a second fluid passage which forms part of the exhaust flowpath, wherein the second fluid passage is physically separated from the first fluid passage by a heat transfer partition; wherein the first fluid passage and the second fluid passage are in thermal communication with each other, wherein the intake flowpath within the first fluid passage is directed in a direction along an intake flowpath side of the heat transfer partition, and wherein the exhaust flowpath within the second fluid passage is directed in a direction along an exhaust flowpath side of the heat transfer partition, the method comprising:

directing the intake flow of fresh air through the intake flowpath;

operating the refrigerant circuit to cause the indoor heat exchanger to thermally condition the intake flow as it passes through the heat-transfer section of the indoor heat exchanger;

directing the exhaust flow of thermally conditioned air through the exhaust flowpath such that the intake flow and the exhaust flow exchange heat energy via the recovery heat exchanger to pre-condition the intake flow before the heat-transfer section of the indoor heat exchanger; and the second inlet receiving fresh air from the external environment and the exhaust flowpath directing the mixture of fresh air and thermally conditioned air to the heat-transfer section of the outdoor heat exchanger, wherein directing the intake flow of fresh air through the intake flowpath includes directing the intake flow of fresh air along a length of a first surface of the heat transfer partition, and directing the exhaust flow of thermally conditioned air within the second fluid passage includes directing the exhaust flow of thermally conditioned air along a length of a second surface of the heat transfer partition in an opposing direction to the intake flow of fresh air, wherein the first surface of the heat transfer partition is an opposing surface of the second surface of the heat transfer partition.

10. The method of claim 9, wherein:

the intake flowpath has a second inlet for receiving thermally conditioned air from the enclosed space at a location that is downstream of the recovery heat exchanger and upstream of the heat transfer section of the indoor heat exchanger in the intake flow direction; and a controller of the environmental control system operates one or more valves or dampers according to a first flow configuration in which the one or more valves or dampers simultaneously:

allow an exhaust flow of thermally conditioned air to pass through the exhaust flowpath;

allow an intake flow of fresh air to pass through the intake flowpath; and prevent thermally conditioned air from the enclosed space to enter the intake flowpath.

11. The method of claim 9, wherein:

the intake flowpath has a second inlet for receiving thermally conditioned air from the enclosed space at a location that is downstream of the recovery heat exchanger and upstream of the heat transfer section of the indoor heat exchanger in the intake flow direction; and a controller of the environmental control system operates one or more valves or dampers according to a second flow configuration in which the one or more valves or dampers simultaneously:

allow an exhaust flow of thermally conditioned air to pass through the exhaust flowpath;

allow an intake flow of fresh air to pass through the intake flowpath; and allow an intake flow of thermally conditioned air from the enclosed space to pass through the intake flowpath.

12. The method of claim 9, wherein the enclosed space is within a vehicle and the external environment is exterior of the vehicle.

13. The environmental control system of claim 1, wherein both the first inlet of the intake flowpath and the outlet of the exhaust flow path are positioned along a top side of the housing, and both the outlet of the intake flowpath and the inlet of the exhaust flow path are positioned along a bottom side of the housing.

14. The vehicle of claim 6, wherein both the first inlet of the intake flowpath and the outlet of the exhaust flow path are positioned along a top side of the housing, and both the outlet of the intake flowpath and the inlet of the exhaust flow path are positioned along a bottom side of the housing.

15. The method of claim 9, wherein both the first inlet of the intake flowpath and the outlet of the exhaust flow path are positioned along a top side of the housing, and both the outlet of the intake flowpath and the inlet of the exhaust flow path are positioned along a bottom side of the housing.

* * * * *